United States Patent
Kiilunen et al.

(10) Patent No.: US 10,682,818 B2
(45) Date of Patent: Jun. 16, 2020

(54) METHOD OF MANUFACTURING A COMPOSITE MATERIAL

(71) Applicant: Neuvokas Corporation, Ahmeek, MI (US)

(72) Inventors: Erik John Kiilunen, Hubbell, MI (US); Kenneth Brian Keranen, Hancock, MI (US); Matthew Paul Kero, Calumet, MI (US)

(73) Assignee: Neuvokas Corporation, Ahmeek, MI (US)

(*) Notice: Subject to any disclaimer, the term of this patent is extended or adjusted under 35 U.S.C. 154(b) by 94 days.

(21) Appl. No.: 15/740,929

(22) PCT Filed: Jun. 30, 2016

(86) PCT No.: PCT/US2016/040353
§ 371 (c)(1),
(2) Date: Dec. 29, 2017

(87) PCT Pub. No.: WO2017/004354
PCT Pub. Date: Jan. 5, 2017

(65) Prior Publication Data
US 2018/0186100 A1 Jul. 5, 2018

Related U.S. Application Data

(60) Provisional application No. 62/188,244, filed on Jul. 2, 2015.

(51) Int. Cl.
*B29C 70/02* (2006.01)
*B29C 70/52* (2006.01)
(Continued)

(52) U.S. Cl.
CPC .......... *B29C 70/025* (2013.01); *B29C 70/521* (2013.01); *B29C 70/526* (2013.01);
(Continued)

(58) Field of Classification Search
CPC ..... B29C 70/025; B29C 70/52; B29C 70/521; B29C 70/525; B29C 70/526;
(Continued)

(56) References Cited

U.S. PATENT DOCUMENTS

| 2,852,840 A | 9/1958 | Harvey |
| 3,296,770 A | 1/1967 | Wilson |

(Continued)

FOREIGN PATENT DOCUMENTS

| CA | 1301421 C | 5/1992 |
| CA | 2629139 A1 | 5/2007 |

(Continued)

OTHER PUBLICATIONS

International Search Report and Written Opinion, PCT/US2016/040353, dated Oct. 10, 2016.

(Continued)

*Primary Examiner* — Michael A Tolin
(74) *Attorney, Agent, or Firm* — Michael Best & Friedrich LLP

(57) ABSTRACT

Method of manufacturing a structural member includes moving fibers (130) along an assembly line (100), applying binder to spaced apart fibers (130) extending across a first area, and applying a traction agent (178) to at least one of the fibers and the binder. A tapered die (180) has a first portion (195) with a first greater diameter positioned to receive the fibers and a second portion with a second lesser diameter positioned downstream of the first portion. Guiding the fibers along the die and decreasing a distance between the plurality of fibers with the die. After decreasing the distance between the plurality of fibers, the fibers extend across a second area that is smaller than the first area, and the plurality of fibers are shaped with a shaping station. Traction (Continued)

agent increases friction between at least one of the fibers and either an adjacent fiber or the die during shaping.

21 Claims, 11 Drawing Sheets

(51) Int. Cl.
| | | |
|---|---|---|
| B29C 70/54 | (2006.01) | |
| B29K 507/04 | (2006.01) | |
| B29K 509/08 | (2006.01) | |
| B29K 509/10 | (2006.01) | |
| B29K 309/00 | (2006.01) | |
| B29K 509/00 | (2006.01) | |

(52) U.S. Cl.
CPC .......... *B29C 70/527* (2013.01); *B29C 70/542* (2013.01); *B29K 2309/00* (2013.01); *B29K 2507/04* (2013.01); *B29K 2509/00* (2013.01); *B29K 2509/08* (2013.01); *B29K 2509/10* (2013.01); *B29K 2995/007* (2013.01)

(58) Field of Classification Search
CPC . B29C 70/527; B29C 70/542; B29K 2507/00; B29K 2507/04; B29K 2509/00; B29K 2509/02; B29K 2509/06; B29K 2509/08; B29K 2509/10; B29K 2995/007
See application file for complete search history.

(56) References Cited

U.S. PATENT DOCUMENTS

| | | | |
|---|---|---|---|
| 3,425,185 A | 2/1969 | Samways et al. | |
| 3,448,489 A | 6/1969 | Boggs | |
| 3,654,028 A | 4/1972 | Goldsworthy | |
| 3,657,040 A | 4/1972 | Shobert | |
| 3,895,896 A | 7/1975 | White et al. | |
| 4,043,098 A | 8/1977 | Putnam, Jr. et al. | |
| 4,154,634 A * | 5/1979 | Shobert ............... | B29C 35/0288 156/180 |
| 4,172,869 A | 10/1979 | Oishi et al. | |
| 4,440,593 A * | 4/1984 | Goldsworthy .......... | B29C 70/50 156/441 |
| 4,445,957 A | 5/1984 | Harvey | |
| 4,563,231 A | 1/1986 | Porrmann et al. | |
| 4,617,683 A | 10/1986 | Christoff | |
| 4,770,834 A | 9/1988 | Nakasone et al. | |
| 4,820,366 A * | 4/1989 | Beever .................. | B29C 70/52 156/166 |
| 4,891,179 A | 1/1990 | Peacock et al. | |
| 4,919,739 A | 4/1990 | Dyksterhouse et al. | |
| 5,042,224 A | 8/1991 | McMahon | |
| 5,051,122 A * | 9/1991 | Reese ................... | B29C 70/508 65/450 |
| 5,077,243 A | 12/1991 | Nakano et al. | |
| 5,081,861 A | 1/1992 | Miura | |
| 5,116,450 A * | 5/1992 | Spoo .................... | B29C 70/526 156/180 |
| 5,122,417 A * | 6/1992 | Murakami ............. | B29C 70/207 428/298.4 |
| 5,127,980 A | 7/1992 | Cavin | |
| 5,178,907 A | 1/1993 | Reinhart | |
| 5,205,898 A | 4/1993 | Wilson et al. | |
| 5,206,085 A | 4/1993 | Nakagawa et al. | |
| 5,284,545 A | 2/1994 | Panzeri et al. | |
| 5,294,387 A | 3/1994 | Nakano et al. | |
| 5,512,351 A | 4/1996 | Miyamichi et al. | |
| 5,593,536 A | 1/1997 | Kaiser | |
| 5,707,329 A | 1/1998 | Pool et al. | |
| 5,749,211 A | 5/1998 | Kimura et al. | |
| 5,783,013 A | 7/1998 | Beckman et al. | |
| 5,811,051 A | 9/1998 | Kikuchi et al. | |
| 6,019,713 A | 2/2000 | Scypinski et al. | |
| 6,316,074 B1 | 11/2001 | Kaiser et al. | |
| 6,428,457 B1 | 8/2002 | Fakuda et al. | |
| 6,982,116 B1 | 1/2006 | Passman et al. | |
| 7,045,210 B2 | 5/2006 | Bleibler | |
| 7,523,597 B2 | 4/2009 | Dominguez, Jr. et al. | |
| 7,758,785 B2 | 7/2010 | Gopal et al. | |
| 7,875,675 B2 | 1/2011 | Brown et al. | |
| 8,123,515 B2 | 2/2012 | Schleelein | |
| 8,187,516 B2 | 5/2012 | Jungert et al. | |
| 8,519,090 B2 | 8/2013 | Amb et al. | |
| 8,597,016 B2 | 12/2013 | Brown et al. | |
| 8,673,101 B2 | 3/2014 | Brandstrom | |
| 8,707,662 B2 | 4/2014 | Borsari et al. | |
| 2002/0063349 A1 | 5/2002 | Edwards et al. | |
| 2002/0088549 A1 | 7/2002 | Fanucci et al. | |
| 2002/0090871 A1 | 7/2002 | Ritchie et al. | |
| 2004/0065044 A1 * | 4/2004 | Bleibler ................. | B29C 53/14 52/649.1 |
| 2004/0194873 A1 | 10/2004 | Branca | |
| 2005/0005947 A1 | 1/2005 | Hampl et al. | |
| 2006/0087059 A1 | 4/2006 | Boissonnat et al. | |
| 2007/0125301 A1 | 6/2007 | Zhou et al. | |
| 2007/0204948 A1 | 9/2007 | Gauchel | |
| 2009/0126860 A1 | 5/2009 | Fanucci et al. | |
| 2010/0098946 A1 | 4/2010 | Tashiro et al. | |
| 2011/0306718 A1 | 12/2011 | Scherzer et al. | |
| 2012/0328896 A1 | 12/2012 | Kar | |
| 2013/0115412 A1 | 5/2013 | Padmanabhan | |
| 2013/0147082 A1 | 6/2013 | Johnson et al. | |
| 2013/0167502 A1 | 7/2013 | Wilson | |
| 2013/0239503 A1 | 9/2013 | Miller et al. | |
| 2013/0330478 A1 | 12/2013 | Ushiyama et al. | |
| 2014/0117581 A1 | 5/2014 | Jansen | |
| 2015/0204075 A1 | 7/2015 | Tsukamoto | |

FOREIGN PATENT DOCUMENTS

| | | |
|---|---|---|
| CA | 2512016 C | 9/2011 |
| CA | 2628938 C | 10/2014 |
| CH | 590724 A5 | 8/1977 |
| CN | 101871556 A | 10/2010 |
| EP | 0272783 A2 | 6/1988 |
| EP | 0320653 A2 | 6/1989 |
| EP | 0179838 B1 | 12/1989 |
| RU | 2210501 C1 | 8/2003 |
| RU | 112664 U1 | 1/2012 |
| WO | 89/03731 A1 | 5/1989 |
| WO | 02/33191 A1 | 4/2002 |
| WO | 02/40255 A2 | 5/2002 |
| WO | 2004/058475 A1 | 7/2004 |
| WO | 2007/061471 A1 | 5/2007 |
| WO | 2007/061473 A1 | 5/2007 |
| WO | 2012/103929 A2 | 8/2012 |
| WO | 2014/182825 A2 | 11/2014 |

OTHER PUBLICATIONS

International Preliminary Report on Patentability, PCT/US2016/040353, dated Jun. 16, 2017.

Russian Patent Office Notice of Grant for Application No. 2018103911 dated Aug. 27, 2019 (15 pages, English translation included).

* cited by examiner

METHOD OF MANUFACTURING A COMPOSITE MATERIAL

FIELD OF THE INVENTION

The present invention relates to a method of manufacturing composite materials, and more particularly to a method of manufacturing fiber reinforced polymer materials.

BACKGROUND

Fiber reinforced polymers include a fiber material bound by a matrix, typically provided by a binder, such as a resin. Fiber reinforced polymers are conventionally manufactured using a pultrusion process, an example of which is illustrated in FIG. 1.

In the pultrusion process, incoming fiber 5 is pulled through a production line 10 by a pulling mechanism 15, such as a pair of driven rollers 20. The fiber 5 is drawn into a bath 25 containing one of a variety of binders. Once wetted, the fiber 5 is drawn through a static die 30 that may have one or more heating zones to initiate curing of the binder. In the pultrusion process, the die 30 serves several functions. It creates pressure to promote wetting of the fiber 5, heats the binder and the fiber 5, controls curing of the binder, and controls the final shape of pultruded product.

Binders have curing profiles that are dictated by chemical reactions (curing, crosslinking, drying, etc.). These curing profiles are functions of the chemical reactivity of the binder, process temperature, and dwell time at the process temperature. As production speeds increase, it becomes increasingly difficult to ensure proper curing of the binder.

The conventional pultrusion process illustrated in FIG. 1 has inherent constraints that severely hinder the speed of the process. The length of the die 30 is the primary constraint on the speed of the process, with process temperature, process friction, and process gas removal providing other limiting constraints. The binder bath 25 presents its own drawbacks, including difficulty mixing and maintaining multi-part, reactive binders, undue amounts of waste, and high operating costs due to the typically large volume of binder needed to fill the bath 25. It has previously not been cost-effective to manufacture fiber reinforced products, especially if one or more fast-curing thermosetting polymers and/or a multi-component thermosetting polymer are utilized as a portion of the binder, for at least the reasons listed above.

SUMMARY

In some embodiments, the invention provides a method of manufacturing a structural member. The method includes moving a plurality of fibers along an assembly line, applying a binder to at least one of the fibers when the fibers are spaced apart and extend across a first area, and applying a traction agent to at least one of the fibers and the binder. Providing a die having a first portion with a first diameter positioned to receive the fibers and a second portion with a second diameter positioned downstream of the first portion. The first diameter is greater than the second diameter and the die is tapered between the first portion and the second portion. The method further includes guiding the fibers along the die and decreasing a distance between the plurality of fibers with the die. After decreasing the distance between the plurality of fibers, the fibers extend across a second area that is smaller than the first area, and the plurality of fibers are shaped with a shaping station. The traction agent increases friction between at least one of the fibers and either an adjacent fiber or the die during shaping.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 2:
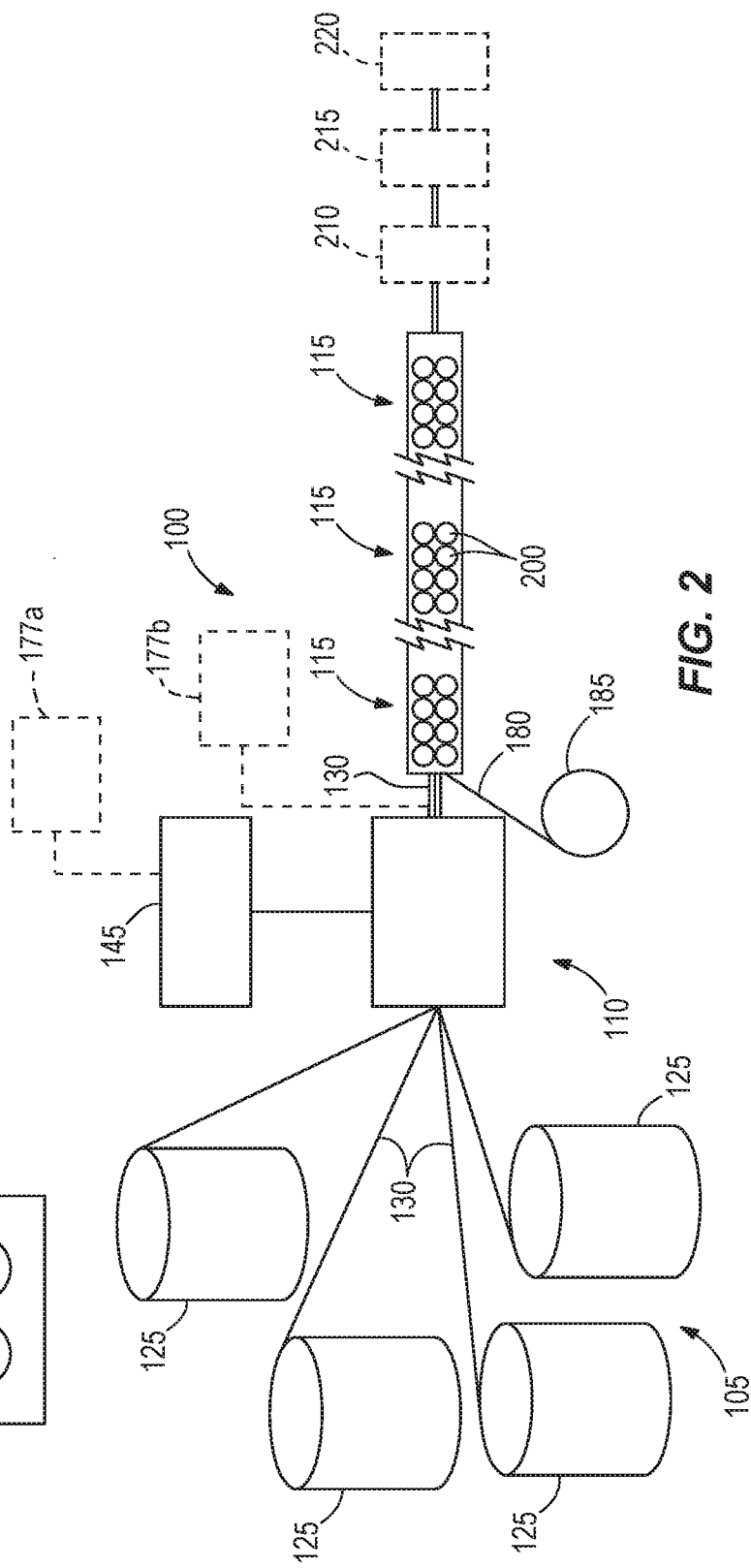
FIG. 2 is a schematic representation of an assembly line according to some embodiments of the invention.
Figure 3:
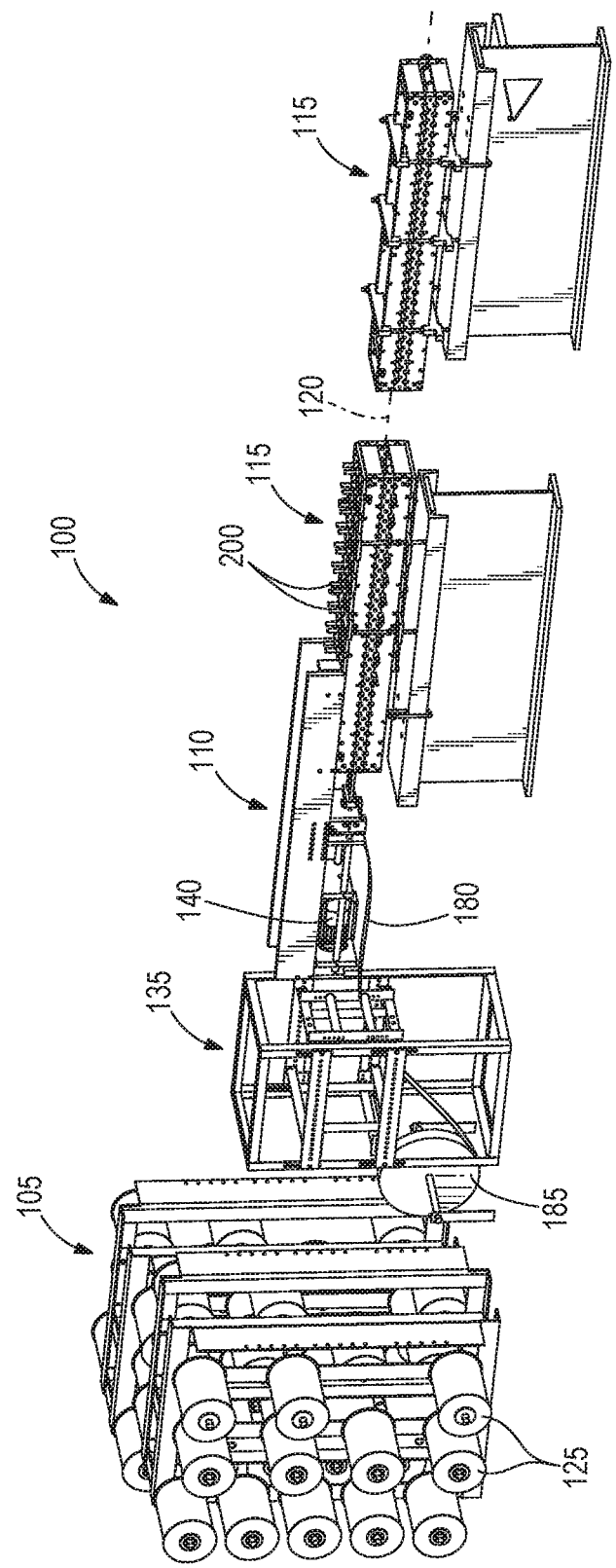
FIG. 3 is a perspective view of a portion of the assembly line of FIG. 2.

FIGS. 2 and 3 illustrate an assembly line 100 for manufacturing fiber-reinforced polymer (FRP) structural composites (i.e. matrix composites). The structural composites may form a wide variety of structural members, such as rebar, I-beams, C-channels, tubes, structural laminates, and the like. The illustrated assembly line 100 includes a roving station 105, a binder application station 110, and a plurality of shaping stations 115. In some embodiments, additional or alternative stations may be included in the assembly line 100. The assembly line 100 is generally linear and defines a central axis 120 along which the structural composite is produced (FIG. 3). As described in greater detail herein, the assembly line 100 enables FRP structural composites to be continuously manufactured at high speed.

The roving station 105 includes a plurality of spools or bobbins 125 that support and dispense strands or rovings of fiber 130 to be included in the structural composite. In the illustrated embodiment, the fiber 130 includes basalt; however, the fiber 130 may include glass, aramid, carbon, or any other desired fiber material. The bobbins 125 may be coupled to a power drive system that controls the fiber feed rate. In such embodiments, dancers or other automatic tensioning devices (not shown) may be provided to maintain a consistent tension on the fibers 130.

After being dispensed from the bobbins 125, the fibers 130 pass through a guide assembly 135 that arranges the fibers 130 for wetting at the binder application station 110 (FIG. 3). In some embodiments, the guide assembly 135 may arrange the fibers 130 in a plane to provide a relatively large, rectangular surface area for wetting. Alternatively, the guide assembly 135 may arrange the fibers 130 into other patterns, such as cylindrical, tubular, or spiral patterns.

In some embodiments, the roving station 105 includes one or more heating elements (not shown) to preheat the fibers 130 to a desired temperature before they are dispensed to the binder application station 110. The heating elements may be located internally within the bobbins 125, or may be external to the bobbins 125. For example, heated air may be directed over the fibers 130 as they leave the roving station 105. Preheating the fibers 130 may reduce the energy input required at the binder application station 110 and may help stabilize the binder curing process, described in greater detail below.

Due to the relatively small diameter of the fibers (when compared to the diameter of the grouped fibers in the die and shaping stations), less time and/or energy is required to preheat the individual fibers than would be required to heat the grouped fibers in one or more of the shaping stations. The shaping stations are operable to maintain the elevated temperature of the preheated fibers. In some embodiments, the binder is heated prior to being applied to the fibers 130.

With reference to FIGS. 2 and 3, the binder application station 110 is located downstream of the roving station 105 such that fibers 130 exiting the guide assembly 135 are drawn into the binder application station 110 to be wetted with a binder, such as a resin. In the illustrated embodiment, the binder is a thermosetting polymer such as a phenolic resin or an epoxy resin. In other embodiments, the binder may include polyester, vinyl ester, Portland cement, or any other suitable binder.

The binder application station 110 is operable to apply a desired amount of binder to the fibers in a precisely metered manner. Specifically, depending upon the desired ratio of binder to fibers, the appropriate amount of binder can be applied directly to the fibers. This is in direct contrast to the binder bath shown in FIG. 1 which does not control the amount of binder that is applied to the fibers. The excess binder must be removed and thus, more waste is created. Also, the entire binder bath must be maintained at the appropriate temperature which is a waste of energy to heat the extra binder, especially when some of the heated binder is removed from the fibers. Also, the product produced with the binder bath can be inconsistent because the ratio of fibers to binder is not controlled. In the present invention, the quantity of binder applied to the fibers can be controlled to assure the desired quality and consistency of the product produced.

Figure 4:
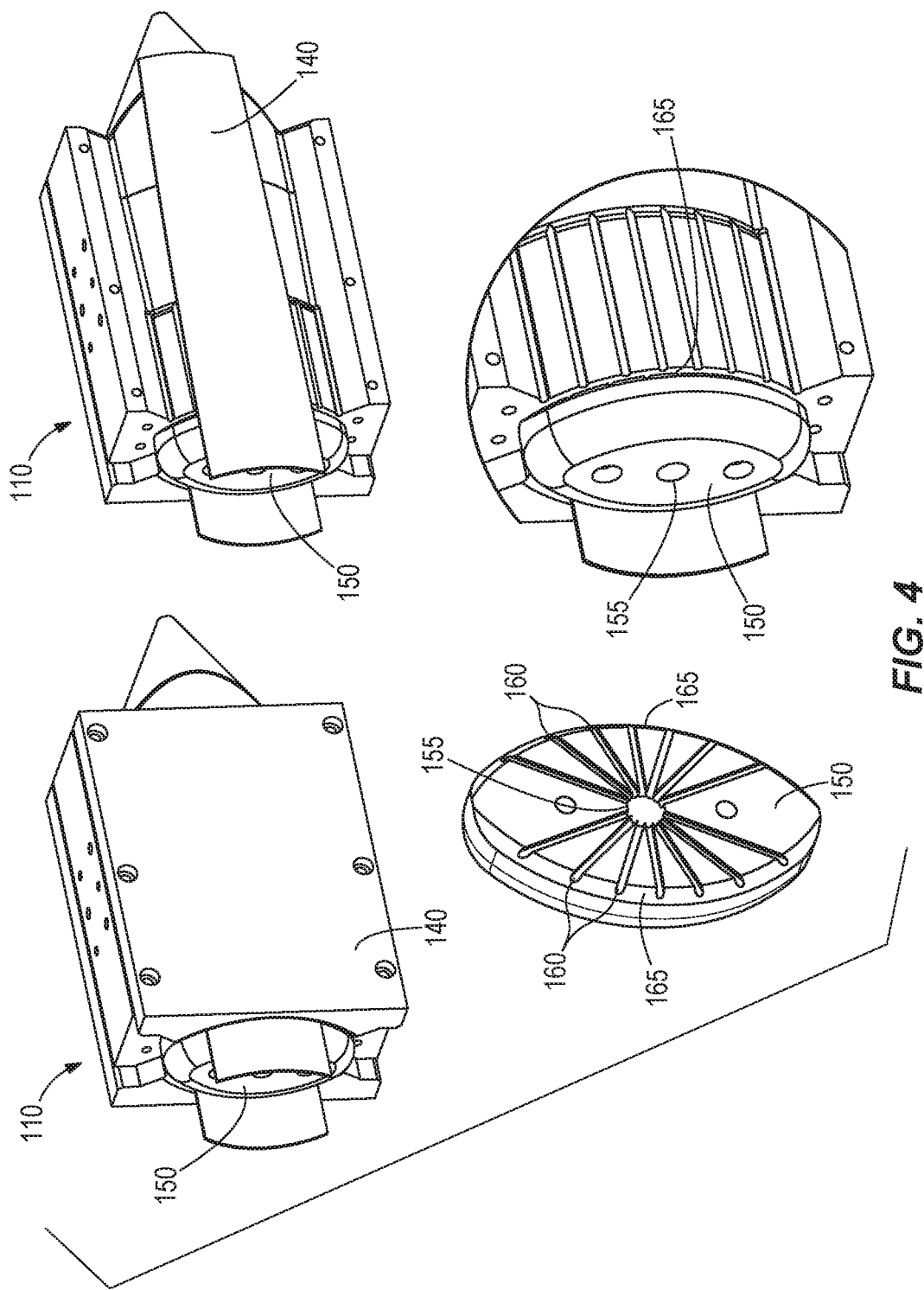
FIG. 4 illustrates a binder application assembly according to one embodiment for use in the assembly line of FIG. 2.

FIGS. 3 and 4 illustrate one embodiment of the binder application station 110. In the illustrated embodiment, the binder application station 110 includes a pressurized well 140. The pressurized well 140 receives the binder from a binder source 145, such as a hopper or storage vessel (FIG. 2). The well 140 includes an end plate 150 having an inlet opening 155 through which the binder may be injected (FIG. 4). The binder is then extruded under pressure through a plurality of channels 160 extending radially-outwardly from the inlet opening 155. The channels 160 communicate with wetting regions 165 located at an outer periphery of the end plate 150.

During operation, the binder is continuously extruded through the channels 160 and into the wetting regions 165. The fibers 130 pass through the wetting regions 165 to be wetted with the binder, beginning the formation of the matrix composite. In the illustrated embodiment, the end plate 150 includes two wetting regions 165 offset from each other by about 180 degrees. Thus, the fibers 130 may be arranged along two paths that are wet simultaneously. The fibers 130 are spaced apart while traveling through the wetting regions 165 to promote thorough coating of the fibers 130 with the binder. In other embodiments, the end plate 150 may include any number of wetting regions. The operating pressure of the well 140 and the number and size of the channels 160 may be variable to provide a desired wetting rate.

Figure 5:
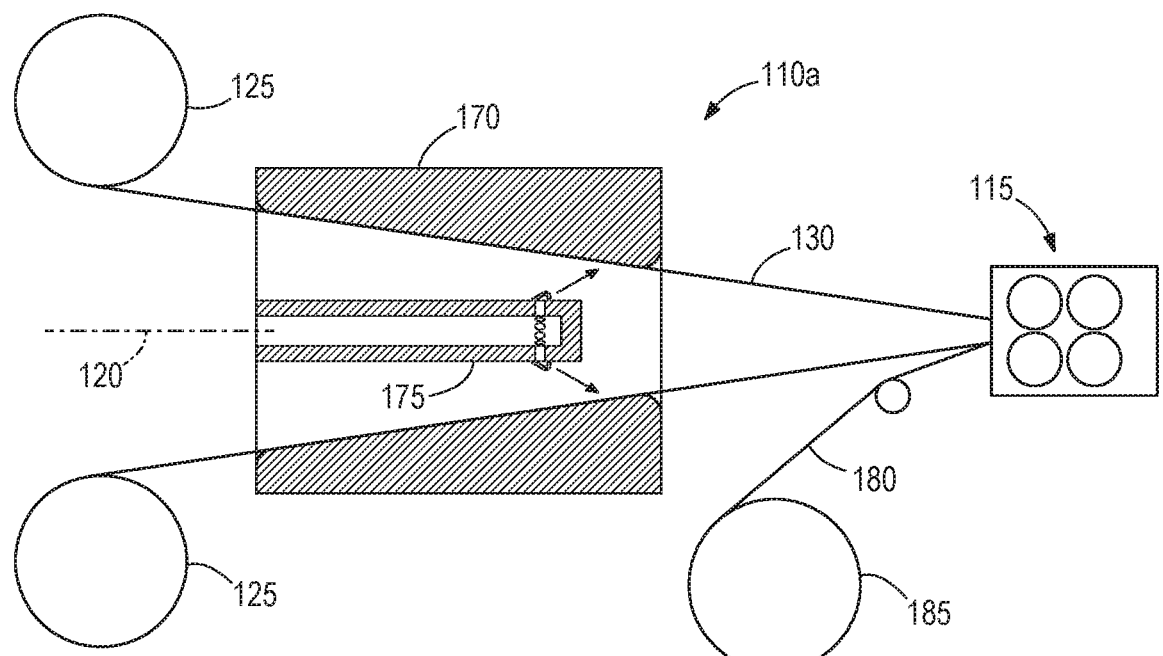
FIGS. 5 and 6 illustrate a binder application assembly according to some embodiments for use in the assembly line of FIG. 2.
Figure 6:
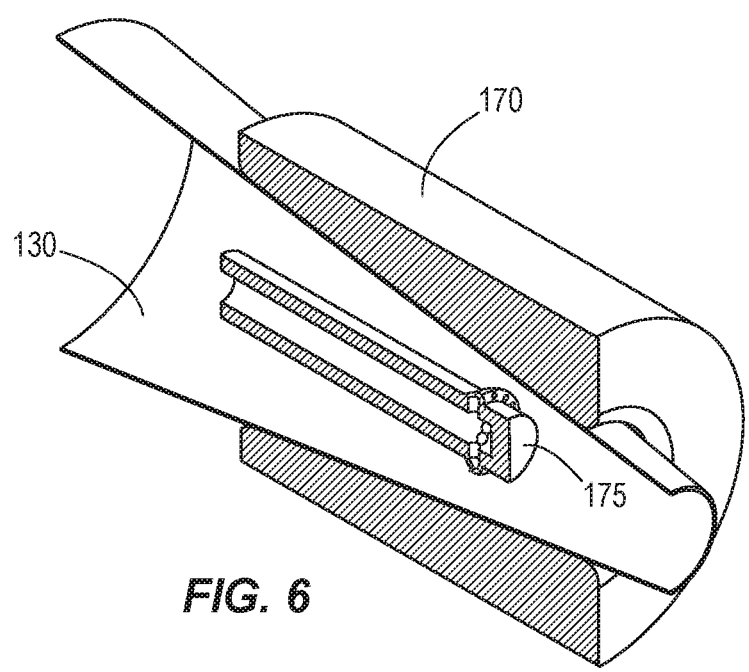

FIGS. 5 and 6 illustrate portions of a binder application station 110a according to another embodiment. The binder application station 110a can be utilized with any of the embodiments described herein. In some embodiments, the binder application station 110a is utilized in addition to the binder application station illustrated and described in other embodiments, whereas in other embodiments, the binder application station 110a is utilized in the place of the binder application station illustrated and described in other embodiments. In the illustrated embodiment, the binder application station 110a includes a die 170 that guides the incoming fibers 130 into a generally tapered or conical arrangement. The die 170 can be capable of moving in a longitudinal direction (i.e. along the central axis 120). This movement may facilitate formation of the incoming fibers 130 into a generally continuous wall or sheet. The binder application station 110a includes a spray nozzle 175 that receives binder from the binder source 145 (FIG. 2) and is operable to spray a stream of binder against the incoming fibers 130. The position of the nozzle 175 may be modified in the longitudinal direction to adjust the binder spray characteristics.

In yet another alternative embodiment, the binder application station may include a binder bath. After passing through the bath, the fibers 130 may be routed through a series of parallel rollers to mechanically agitate and physically force the binder into the passing fibers. The binder content of the impregnated fibers may be controlled using wipers and/or rollers. In addition, the binder content may be controlled by directing some of the fibers 130 to bypass the binder bath.

In this alternative embodiment, the assembly line 100 may further include an oven buncher station between the binder application station and the one or more shaping stations 115 to heat the binder impregnated fiber 130, finish the wetting process, begin the curing process, and roughly form the wetted fibers. In addition, the oven buncher station may include one or more drive rollers to pull the fibers from the roving station 105 and through the binder application station.

With reference to FIG. 2, in some embodiments, the illustrated assembly line 100 includes two separate traction agent sources 177a, 177b that supply a traction agent to be applied to the fibers 130. Either or both of the traction agent sources 177a, 177b can be utilized with any of the embodiments described herein. In some embodiments, the traction agent increases friction between adjacent fibers 130 to inhibit the fibers 130 from slipping relative to each other during processing on the assembly line 100. In some embodiments, the traction agent increases friction between the fibers 130 and the die 180. The traction agent preferably includes a non-metallic powder, such as diatomaceous earth. In other embodiments, the traction agent can include talc, mica, pearlite, calcium carbonate, fumed silica, quartz, aluminum oxide, silicon carbide, carbon black, carbon nanotubes, and the like.

Figure 16:
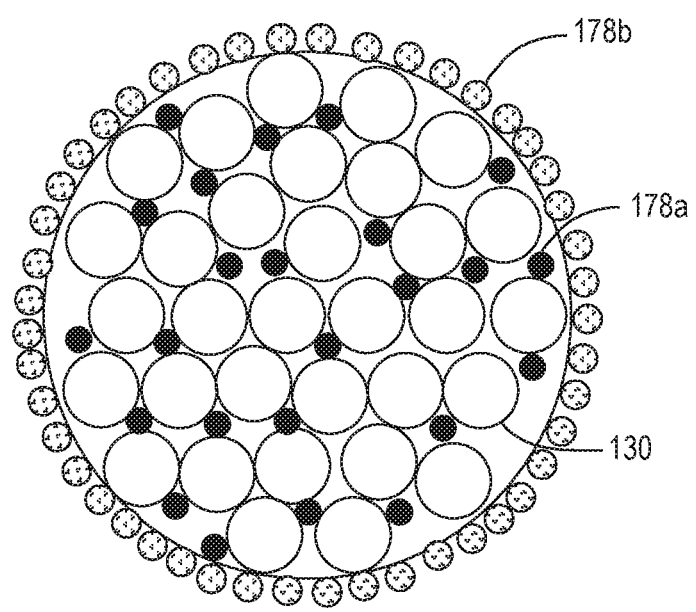
FIG. 16 is a representative cross-sectional view of a structural member including a plurality of fibers and traction agents.

With reference to FIG. 16, the traction agent includes particles 178a, 178b that are smaller in diameter than the fibers 130. The traction agent particles 178a can be interspersed among the fibers 130 and can fill voids between adjacent fibers 130. In some embodiments, the traction agent particles 178a have an average diameter less than about 17 microns. In other embodiments, the traction agent particles 178a have an average diameter less than about 15 microns. In other embodiments, the traction agent particles 178a have an average diameter of about 13 microns. In other embodiments, the traction agent particles 178a have an average diameter between about 5 microns and about 20 microns. In other embodiments, the traction agent particles 178a have an average diameter between about 20% of an average diameter of the fibers 130 and about 90% of the average diameter of the fibers 130. In other embodiments, the traction agent particles 178a have an average diameter that is about 75% of an average diameter of the fibers 130.

The traction agent is preferably softer than the fibers 130. In some embodiments, the traction agent particles 178a have a Mohs hardness of about 6 or less. In other embodiments, the traction agent particles 178a have a Mohs hardness of about 4 or less. In other embodiments, the traction agent particles 178a have a Mohs hardness of about 2 or less. In other embodiments, the traction agent particles 178a have a Mohs hardness between about 0.5 and about 2. In some embodiments, the traction agent particles 178a have a hardness between about 10% of a hardness of the fibers 130 and about 50% of a hardness of the fibers 130.

In some embodiments, the traction agent particles 178a have a rounded shape, generally free of sharp edges, corners, or points. In some embodiments, the traction agent particles 178a also include a plurality of surface pores. The surface pores can provide increased contact between the traction agent particles 178a and the fibers 130 as well as improved resin retention and penetration. The particles 178a may also interact with the resin to create a thixotropic or gelling effect, helping to maintain the wetted fibers 130 in a desired shape until the resin is cured.

Referring to FIG. 2, the traction agent source 177a is positioned to introduce the traction agent particles 178a into the binder source 145. The traction agent mixes with the binder to form a binder mixture in which the traction agent particles 178a are suspended. In some embodiments, the traction agent source 177a and the binder source 145 can respectively dispense the traction agent and the binder into a mixing chamber where the traction agent and the binder are combined to form the binder mixture. The binder mixture is then supplied to the binder application station 110 where it is applied to the fibers 130.

With continued reference to FIG. 2, the traction agent source 177b is positioned to introduce the traction agent particles 178b to the wetted fibers 130 as the fibers 130 leave the binder application station 110. In some embodiments, the traction agent source 177b is positioned above the fibers 130, and one or more shakers or other agitators is provided to facilitate dispensing a desired amount of the traction agent particles 178b on to the fibers 130 under the influence of gravity. In other embodiments, the traction agent particles 178b can be entrained in a compressed gas stream and sprayed on to the fibers 130. In yet other embodiments, the traction agent particles 178b can be mixed with a liquid and sprayed on to the fibers 130.

In some embodiments, the traction agent particles 178b are sized between 54 grit (0.012 inches) and 220 grit (0.0012 inches). The traction agent particles 178b are applied to the fibers 130 at a rate that corresponds to the process speed.

The traction agent particles 178a and 178b are applied to the fibers 130 and the binder before the binder is cured. The traction agent sources 177a, 177b can be incorporated into the assembly line 100 individually or in combination. For example, in one embodiment, the assembly line 100 includes only the traction agent source 177a such that the traction agent particles 178a are applied to the fibers 130 only via the resin mixture. In another embodiment, the assembly line 100 includes only the traction agent source 177b such that the traction agent particles 178b are applied only to the wetted fibers 130. In another embodiment, the assembly line 100 includes both traction agent sources 177a, 177b such that the traction agent particles 178a are applied to the fibers 130 as part of the resin mixture and the traction agent particles 178b are applied to the wetted fibers 130 as the fibers 130 leave the binder application station 110.

Figure 7:
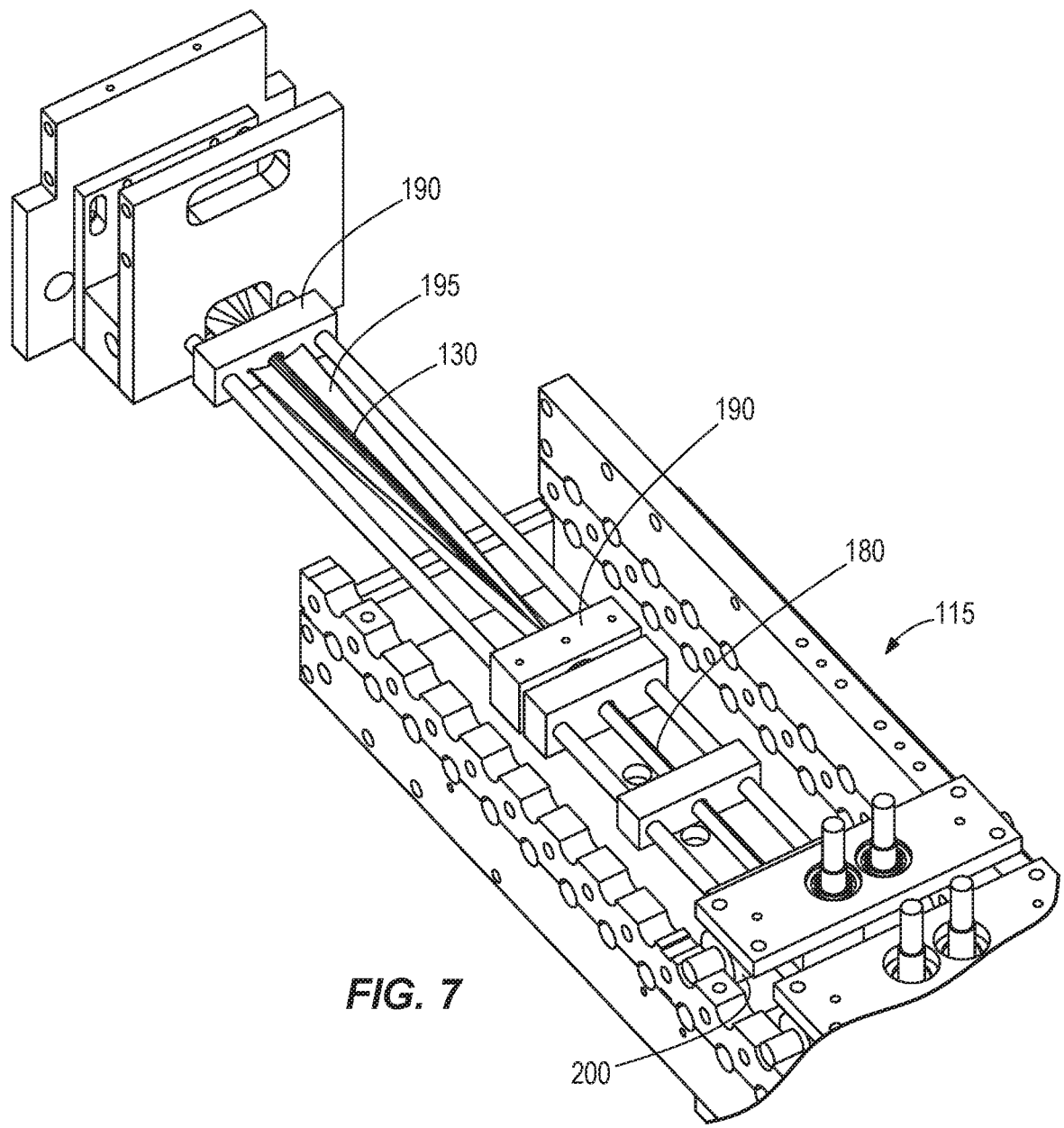
FIG. 7 is a perspective view of another portion of the assembly line of FIG. 2, illustrating a die being curled around a length of wetted fibers.
Figure 8:
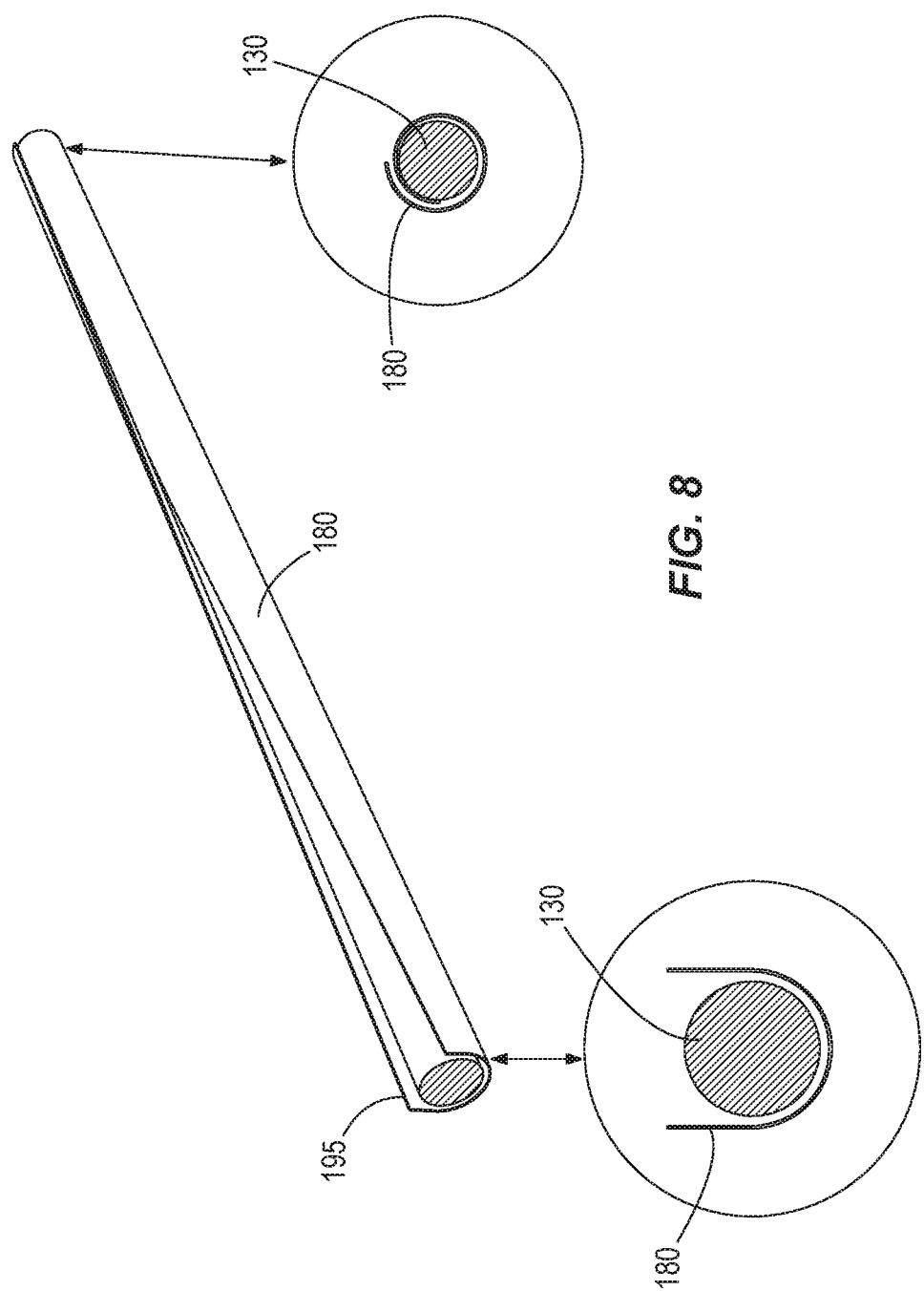
FIG. 8 is a perspective representation of the die being curled around the length of wetted fibers.

With reference to FIGS. 2, 7, and 8, the assembly line 100 further includes a continuously-conformable translating die 180 that is wrapped around the wetted fibers 130 as they exit the binder application station 110. The illustrated die 180 is a strip of paper fed from a roll 185 (FIG. 3). The paper die 180 travels along the central axis 120 adjacent the wetted fibers 130, and a series of Teflon guide plates 190 gradually curls the die 180 around the wetted fibers 130 until the die completely surrounds and encases the wetted fibers 130 (FIGS. 7 and 8). As the wetted fibers 130 enter a first portion or entrance 195 of the die 180, the fibers 130 are compressed from the relatively large, rectangular area into a smaller generally circular area corresponding with the diameter of the die at the entrance 195.

The die 180 travels with the wetted fibers 130 through the remainder of the assembly line 100. As described in greater detail below, the die 180 facilitates travel of the wetted fibers 130 through the shaping stations 115 by inhibiting the wetted fibers 130 from sticking to the shaping stations 115. In addition, the die 180 constrains the wetted fibers 130 during curing, facilitates mixing of the binder and the fibers 130 to ensure thorough wetting, and helps to maintain a consistent curing pressure and temperature.

The process speed or product output rate of the assembly line 100 and any other continuous FRP manufacturing process is governed by the following equation:

$$\text{Process Speed} = \frac{\text{Die Length}}{\text{Resin Curing Time}}$$

Figure 1:
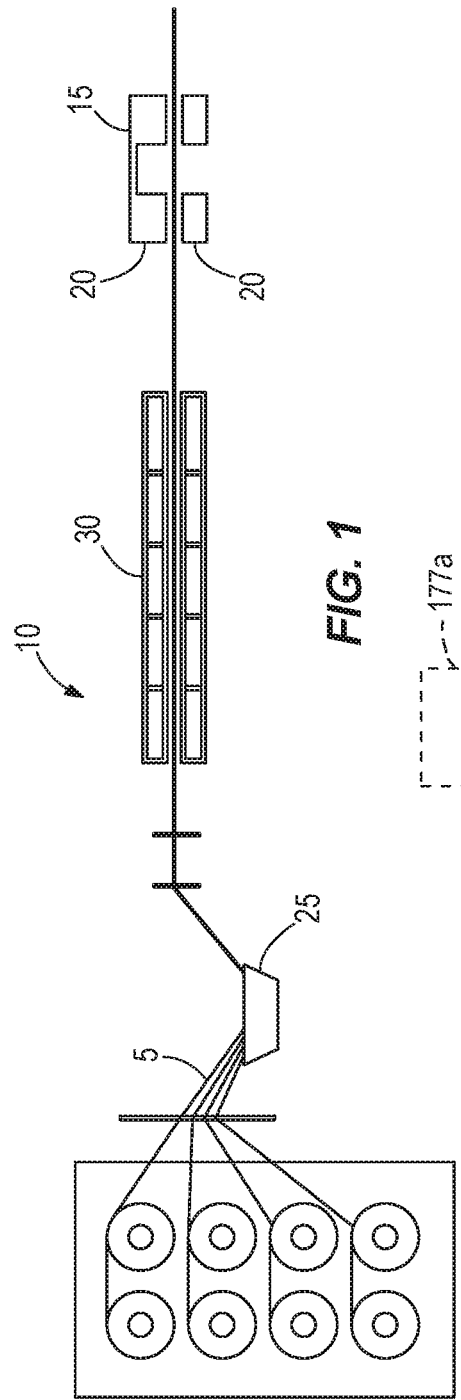
FIG. 1 is a schematic representation of a typical pultrusion process.

Because the continuously-conformable translating die 180 moves with the wetted fibers 130, it can be many times longer than the static die 30 employed in the typical pultrusion process (FIG. 1). Accordingly, the assembly line 100 may operate at a process speed many times greater than that of the typical pultrusion process. For example, if the translating die has a length of 2,000 feet, and the binder requires 2 minutes to cure, the assembly line 100 will have a potential process speed of 1,000 feet per minute. In some embodiments, the assembly line 100 is configured to have a process speed greater than about 20 feet per minute. In other embodiments, the assembly line 100 is configured to have a process speed between about 20 feet per minute and about 40 feet per minute. In other embodiments, the assembly line 100 is configured to have a process speed between about 40 feet per minute and about 60 feet per minute. In other embodiments, the assembly line 100 is configured to have a process speed between about 60 feet per minute and about 80 feet per minute. In other embodiments, the assembly line 100 is configured to have a process speed between about 80 feet per minute and about 100 feet per minute. In other embodiments, the assembly line 100 is configured to have a process speed between about 50 feet per minute and about 100 feet per minute. In other embodiments, the assembly line 100 is configured to have a process speed between about 20 feet per minute and about 100 feet per minute. In other embodiments, the assembly line 100 is configured to have a process speed between about 20 feet per minute and about 1,000 feet per minute. In other embodiments, the assembly line 100 is configured to have a process speed between about 100 feet per minute and about 1,000 feet per minute.

The paper die 180 may be coated with a release agent, such as silicone, to facilitate removal of the die 180 from the finished structural composite. In addition, the paper die 180 may be relatively porous to permit gas and vapor to be released through the die 180. Alternatively, the die 180 may be substantially air tight. In some embodiments, the traction agent particles 178*b* can function as a release agent between the die 180 and the fibers 130.

The die 180 may include other substrate materials or combinations of materials applied to the wetted fibers 130 in various ways. For example, in some embodiments the die 180 may include a powder or a liquid (e.g., molten wax) that is applied to the wetted fibers 130 and subsequently hardened or cured using UV light, temperature, a chemical reactant, or other suitable means. In other embodiments, the die 180 may include a vapor releasing micro-porous membrane such as GORE-TEX. In other embodiments, the die 180 may include a macro-porous material such as a woven fabric or fiber mat. In yet other embodiments, the die 180 may include one or more metal films, such as non-sacrificial stainless steel, carbon steel cover, or copper etc.

In some embodiments the die 180 may be wetted by the binder to bind the die 180 to the matrix composite, thereby creating an integrated construction that includes all or a portion of the die 180. Thus, the die material may be chosen to provide the produced structural composite with additional desired properties. For example, the die 180 may include an electrically-conductive material to provide electrical conductivity to an otherwise non-conducting composite. The die material may have an affinity to an external binding compound (e.g., Portland cement) to facilitate integration of the structural composite (e.g., rebar) into its particular application (e.g., reinforced concrete).

Now referring to FIGS. 2 and 3, the shaping stations 115 are located downstream of the binder application station 110. In the illustrated embodiment, the assembly line 100 includes first, second, and third shaping stations 115 that are spaced from one another along the central axis 120 (FIG. 3). In other embodiments, the assembly line 100 may include any number of shaping stations 115.

The shaping stations 115 each include at least one guide that contacts and shapes the fibers 130. In some embodiments, the guide can include one or more rollers with one or more slots sized to receive and shape the fibers 130. In some embodiments, the guide can include one or more stationary or rotating dies that have one or more openings sized to receive and shape the fibers 130. The slots in the rollers and the openings in the stationary dies can each have different shapes and sizes to mold the fibers 130 into different shapes and sizes.

Figure 9:
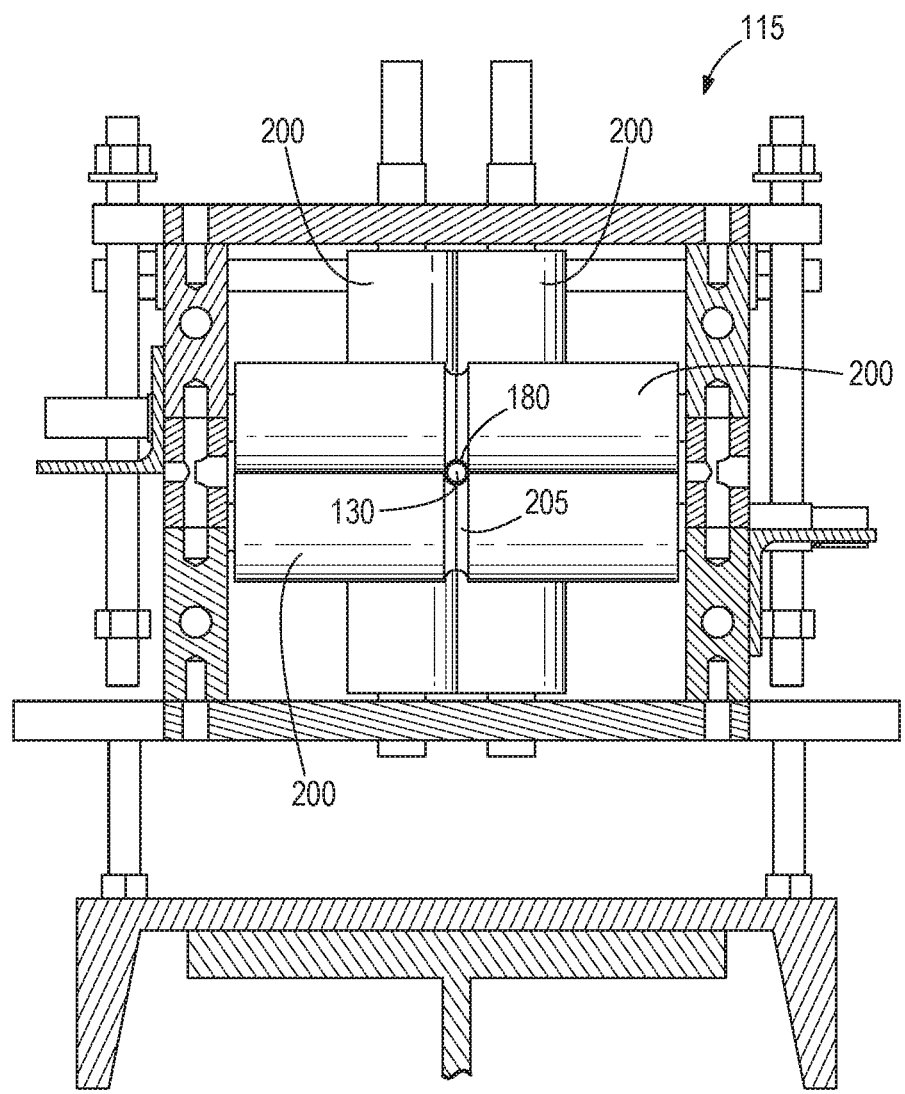
FIG. 9 is an end view of a shaping station of the assembly line of FIG. 2.

Each of the illustrated shaping stations 115 includes a plurality of rollers 200. The rollers 200 are arranged in pairs, and each includes a groove 205 through which the die-wrapped fibers 130 are rolled and shaped (FIG. 9). In some embodiments, pairs of rollers 200 may be positioned in different orientations. For example, pairs of rollers 200 may alternate between horizontal and vertical orientations. Some or all of the rollers 200 may be driven using variable speed drive motors to draw the die 180 and fibers 130 through the assembly line 100.

Referring again to FIGS. 2 and 3, each shaping station 115 can further include thermal transfer panels (not shown) to allow precise control of the process temperature. For example, each shaping station 115 may be controlled to maintain the wetted fibers 130 at a stable, controlled temperature that cures the binder at a rate of speed that corresponds to the process speed. The specific temperature is dependent upon the type of binder used and the process speed of the assembly line. In some embodiments, a phenolic resin is used as the binder and the fibers are maintained at a temperature of about 160 degrees Celsius. In some embodiments, an epoxy resin is used as the binder and the fibers are maintained at a temperature of between about 50 and about 90 degrees Celsius. Accordingly, the binder curing process may be completed while the shaped, wetted fibers 130 are traveling through the shaping stations 115.

Process temperature can be controlled in multiple zones along the length of each shaping station 115 to promote or reduce the speed of curing along the length of the die 180. The rollers 200 exert pressure on the die 180 to provide the required curing pressure. As the die 180 and fibers 130 pass between adjacent shaping stations 115, the product may be cooled if desired (either by exposure to the ambient environment between the adjacent shaping stations 115 or through controlled cooling zones), and gas or vapor byproducts may be vented through the die 180. This is not possible in a typical pultrusion process, as the static dies 30 (FIG. 1) are typically impermeable. In some embodiments, one or more of the shaping stations 115 cool the die 180 and the fibers 130 to a temperature below the glass transition temperature of the binder. Therefore, the die 180 and fibers 130 dispensed from the shaping stations 115 can maintain its shape. In other embodiments, the die 180 and fibers 130 are not cooled below the glass transition temperature until after the die 180 and fibers 130 have exited the shaping stations 115 to permit final manipulation of the die 180 and fibers 130 into the desired final shape and/or formation of any surface configurations (such as, for example, ribs, protrusions, recesses and/or other suitable surface configurations).

In a typical process, gaps between any stations must be minimized so that proper support is offered to the fibers along an entire length of the assembly line. In contrast, the illustrated shaping stations 115 are spaced apart a distance in the die flow direction, because the die 180 provides sufficient support to the fibers 130 between the shaping stations 115. The space between the shaping stations 115 permits air and water to vent from the die 180 and fibers 130. Further, the spaced apart shaping stations 115 extend across a longer distance than if the shaping stations 115 were directly adjacent. The increase in the overall distance of the shaping stations 115 permits the die 180 to move through the shaping stations 115 at a faster speed while still partially or fully curing in the shaping stations 115. Therefore, by using more shaping stations 115 and spaced apart shaping stations 115, the process speed can be increased, thereby increasing productivity and profitability. The distance between the shaping stations 115 also decreases the capital cost of building and installing the assembly, when compared to an arrangement in which shaping stations are adjacent for an entire length of the shaping assembly. The shaping stations 115 can be modular, such that one or more shaping stations 115 can be added, removed or repaired without a substantial loss of production. Instead of shutting down production of the entire assembly line (as would be required for units that utilized a single, stationary die), the production would be shut down for a brief period to permit addition, removal or replacement of one or more of the shaping stations 115. The removed shaping station 115 can be repaired or stored while the assembly line is in operation.

With reference to FIGS. 10-15, one or more of the shaping stations 115 may also dynamically manipulate the die 180 and the fibers 130 to promote thorough wetting and homogeneous curing. Wetting is improved through shear viscosity changes that are induced by dynamically modifying the cross-sectional area of the matrix composite. Further shear mixing of the matrix composite can be induced by selectively increasing and decreasing the mechanical pressure applied by the shaping station 115. In some embodiments, the shaping station 115 can be configured to have incomplete wet-out of the fibers 130 to improve the flexibility of the fibers 130 upon curing.

In some embodiments, the guides may be configured to progressively increase the applied mechanical pressure over the length of the die 180. In some embodiments, the increase in pressure is created by moving the fibers 130 through a tapered stationary die that has an opening with a decreasing diameter along the length. In other embodiments, the increase in mechanical pressure can be created by moving the fibers 130 through a series of stationary dies, each of which has progressively smaller openings. In some embodiments, the holes in the stationary dies can have different shapes and sizes of openings to dynamically alter the cross-sectional shape of the die 180 and the fibers 130.

Figure 10:
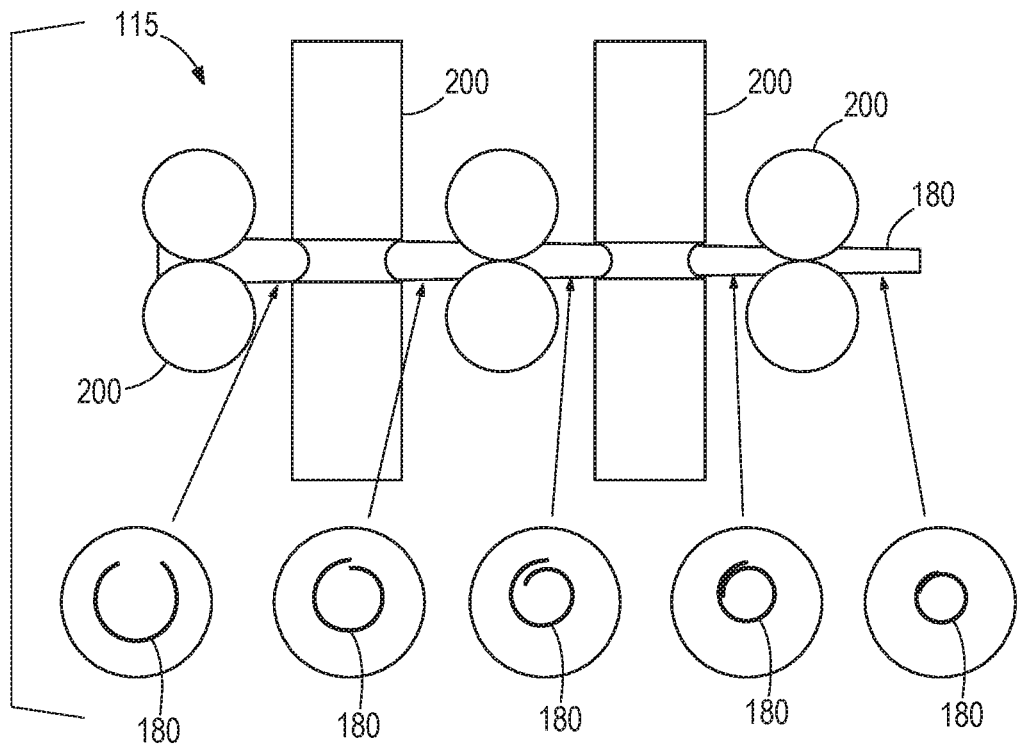
FIG. 10 is a schematic representation of a shaping station according to some embodiments.
Figure 11:
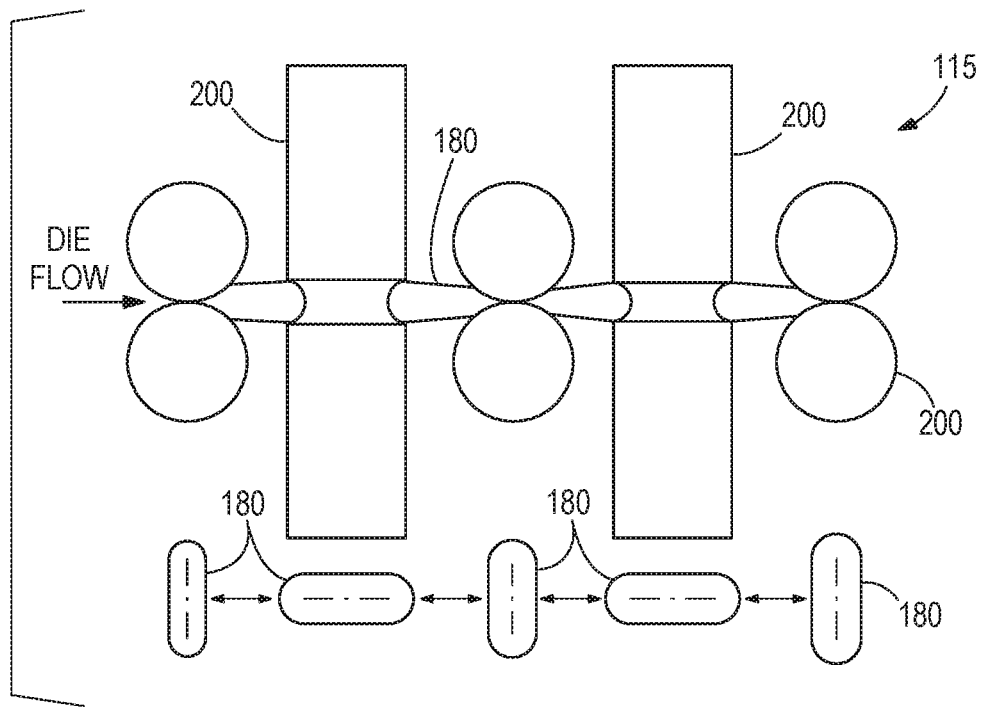
FIG. 11 is a schematic representation of a shaping station according to some embodiments.
Figure 12:
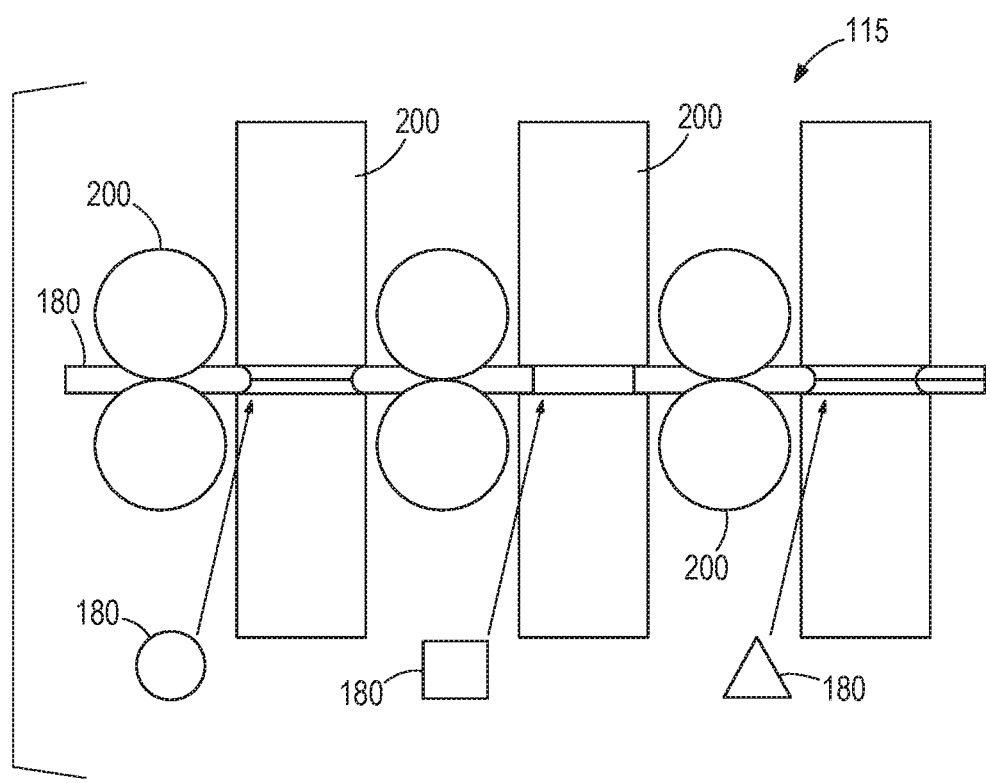
FIG. 12 is a schematic representation of a shaping station according to some embodiments.
Figure 13:
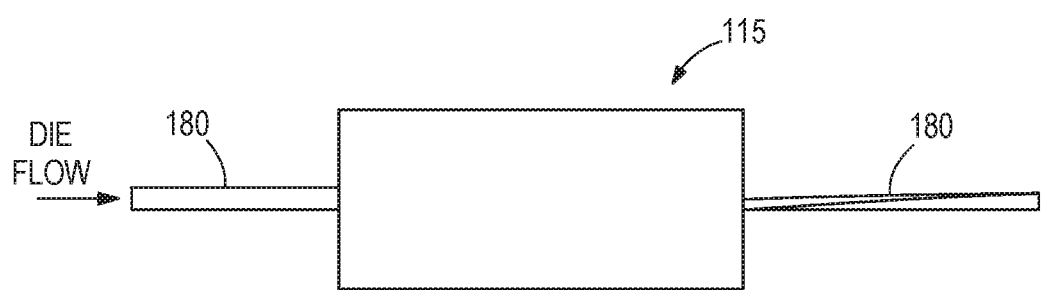
FIG. 13 is a schematic representation of a shaping station according to some embodiments.
Figure 14:
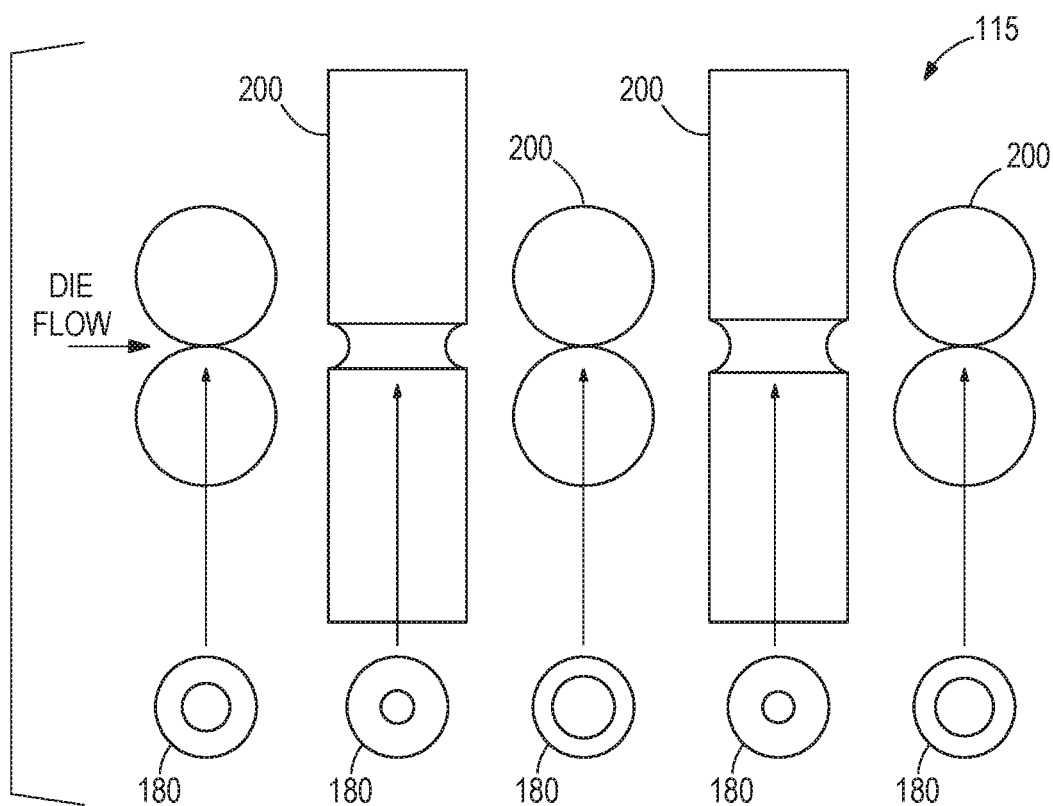
FIG. 14 is a schematic representation of a shaping station according to some embodiments.
Figure 15:
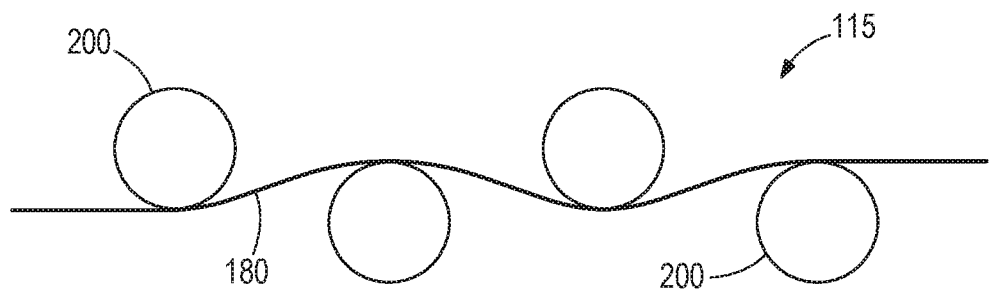
FIG. 15 is a schematic representation of a shaping station according to some embodiments.

In the embodiment illustrated in in FIG. 10, the rollers 200 are configured to progressively increase the applied mechanical pressure over the length of the die 180. As such, the cross-sectional area of the die 180 may decrease through each successive pair of rollers 200. This promotes thorough wetting and compacting of the fibers 130. In other embodiments, the rollers 200 may be configured to dynamically alter the cross-sectional shape of the die 180 and the fibers 130 (FIGS. 11-14). For example the die 180 may be rolled into an oval shape that assumes different orientations at alternating roller pairs 200 to promote further shear mixing (FIG. 11). Alternatively, die 180 may be rolled into a variety of other shapes, such as oval, circle, rectangle, square, triangle, etc. (see, for example, FIG. 12). In other embodiments, one or more of the shaping stations 115 may twist the die 180 and the fibers 130 about the central axis 120 (FIG. 13). In yet other embodiments, one or more of the shaping stations 115 may alternatingly increase and decrease the cross-sectional area of the die 180 (FIG. 14). In still other embodiments, the rollers 200 may be offset to create undulations in the die 180 and the fibers 130 (FIG. 15). Each of the shaping stations 115 can have different arrangements and configurations of rollers 200 and/or stationary dies.

In some embodiments, the assembly line 100 may further include a burn-off station 210 to thermally abrade the cured surface of the composite structure (FIG. 2). The burn-off station 210 may be employed to remove the die, to expose portions of the fiber, and/or to provide a carbonaceous char that may have an affinity for an external binding compound like Portland cement.

In some embodiments, the assembly line 100 may further include a post-cure station 215. The post-cure station 215 may include one or more heating elements to provide any necessary secondary curing time and temperature controls. In addition, the post-cure station 215 may include one or more machining devices operable to shape the structural composite into a desired final shape. For example, the structural composite may be bent or cut and folded into a C-channel shape, and I-beam shape, a spiral shape or other desirable shape.

In some embodiments, the assembly line 100 may further include a packaging station 220. The packaging station 220 may include one or more cutting devices operable to cut the structural composite into a desired length for sale and shipping. The structural composite may be marked with product information, branding information, or other indicia, and then packaged for shipping.

In operation, a plurality of fibers 130 is dispensed from the roving station 105 and moved along the assembly line 100 to the binder application station 110. The fibers 130 are generally spaced apart as they enter the binder application station 110 such that the fibers 130 extend across a first, relatively large surface area. The fibers 130 are wetted with binder or, in some embodiments, with a binder mixture including the traction agent. In some embodiments, the traction agent is applied to the wetted fibers 130 leaving the binder application station 110.

The wetted fibers 130 are then guided into the first portion 195 of the die 180 proximate the binder application station 110, and the die 180 is curved to wrap around the wetted fibers 130. As the die 180 is wrapped around the wetted fibers 130, the fibers 130 are compressed together. The wetted fibers 130, encased by the die 180, are then fed into the shaping stations 115.

In the shaping stations 115, the die 180 and the wetted fibers 130 are compressed between the guides, such as the sets of rollers 200 or the stationary dies to mix the binder and the fibers 130, to form the product shape. The die 180 separates the wetted fibers 130 from the rollers 200 and/or the stationary dies in order to prevent the binder from sticking to the rollers 200 and/or the stationary dies. Heat is applied throughout the shaping stations 115 to promote curing of the binder. As the die 180 travels between adjacent shaping stations, the matrix may cool and/or expel gas and vapor byproducts.

During shaping, the traction agent particles 178*a* are interspersed among the fibers 130 and provide increased friction between adjacent fibers 130 (FIG. 16). Accordingly, the traction agent can reduce interlaminar slippage to provide a more consistent and sound structural composite. The traction agent particles 178*a* can also fill voids between the fibers 130, facilitate resin penetration, and impart desirable thixotropic properties.

In some embodiments, the traction agent particles 178*b* are applied to the die 180 and/or the fibers 130 before or after curing has been completed. The traction agent particles 178*b* may be chosen to improve physical bond characteristics between the final composite of the fibers 130 and the binder and the material the final composite will be connected to, such as, for example, concrete.

Various features of the invention are set forth in the following claims.

What is claimed is:

1. A method of manufacturing a structural member, the method comprising:
moving a plurality of fibers (130) along an assembly line (100);
applying a binder to at least one of the plurality of fibers (130), wherein when the binder is applied, the plurality of fibers (130) are spaced apart and extend across a first area;
applying a traction agent (178) to at least one of the plurality of fibers (130) and the binder;
providing a die (180) having a first portion (195) with a first diameter positioned to receive the plurality of fibers (130) and a second portion with a second diameter positioned downstream of the first portion (195), wherein the first diameter is greater than the second diameter and wherein the die (180) is tapered between the first portion (195) and the second portion;
guiding the plurality of fibers along the die (180);
decreasing a distance between adjacent fibers of the plurality of fibers (130) with the die (180), wherein after decreasing the distance between adjacent fibers of the plurality of fibers (130), the plurality of fibers (130) extend across a second area that is smaller than the first area; and
after decreasing, shaping the plurality of fibers (130) with a shaping station (115),
wherein the traction agent increases friction between at least one of the fibers (130) and either an adjacent fiber or the die during shaping, and
wherein the die (180) is formed from a sacrificial film.

2. The method of claim 1, wherein applying the traction agent includes applying the traction agent to the binder and mixing the traction agent with the binder before applying the binder.

3. The method of claim 1, wherein applying the traction agent includes applying a first traction agent to the binder and mixing the first traction agent with the binder before applying the binder, and further includes applying a second traction agent to at least one of the plurality of fibers (130) after applying the binder.

4. The method of claim 1, wherein moving the plurality of fibers (130) includes moving a plurality of basalt fibers (130), and wherein the traction agent is softer than the plurality of basalt fibers (130).

5. The method of claim 1, wherein the traction agent has a Mohs hardness of 6 or less.

6. The method of claim 1, wherein the traction agent is a powder including at least one material selected from a group consisting of diatomaceous earth, talc, mica, pearlite, calcium carbonate, fumed silica, quartz, aluminum oxide, silicon carbide, carbon black, and carbon nano-tubes.

7. The method of claim 1, wherein the traction agent includes diatomaceous earth.

8. The method of claim 1, wherein each of the plurality of fibers (130) defines a fiber diameter, and wherein the traction agent has a smaller particle size than the fiber diameter of each of the plurality of fibers (130).

9. The method of claim 1, wherein the traction agent has a particle size smaller than 17 microns.

10. The method of claim 1, wherein the traction agent has a particle size between 0.0021 inches and 0.021 inches.

11. The method of claim 1, wherein the traction agent is a non-metallic powder.

12. The method of claim 1, further comprising moving the plurality of fibers (130) out of the shaping station (115) after shaping the plurality of fibers (130), and curing the plurality of fibers after moving the plurality of fibers (130) out of the shaping station.

13. The method of claim 1, wherein applying the traction agent (178) to at least one of the fibers (130) and the binder includes applying the traction agent (178) to at least one of the fibers (130) after applying the binder.

14. The method of claim 1, wherein moving the plurality of fibers (130) along the assembly line (100) includes moving the plurality of fibers (130) at a speed of greater than about 20 feet per minute.

15. A method of manufacturing a structural member, the method comprising:
moving a plurality of fibers (130) along an assembly line (100);
applying a binder to at least one of the plurality of fibers (130), wherein when the binder is applied, the plurality of fibers (130) are spaced apart and extend across a first area;
applying a traction agent (178) to at least one of the plurality of fibers (130) and the binder after applying the binder;
providing a die (180) having a first portion (195) with a first diameter positioned to receive the plurality of fibers (130) and a second portion with a second diameter positioned downstream of the first portion (195), wherein the first diameter is greater than the second diameter and wherein the die (180) is tapered between the first portion (195) and the second portion;
guiding the plurality of fibers along the die (180);
decreasing a distance between adjacent fibers of the plurality of fibers (130) with the die (180), wherein after decreasing the distance between adjacent fibers of the plurality of fibers (130), the plurality of fibers (130) extend across a second area that is smaller than the first area; and
after decreasing, shaping the plurality of fibers (130) with a shaping station (115),
wherein the traction agent increases friction between at least one of the fibers (130) and either an adjacent fiber or the die during shaping.

16. The method of claim 1, wherein applying the traction agent includes applying a first traction agent to the binder and mixing the first traction agent with the binder before applying the binder, includes applying a second traction agent to at least one of the plurality of fibers (130) after applying the binder.

17. The method of claim 15, wherein the traction agent is a powder including at least one material selected from a group consisting of diatomaceous earth, talc, mica, pearlite, calcium carbonate, fumed silica, quartz, aluminum oxide, silicon carbide, carbon black, and carbon nano-tubes.

18. A method of manufacturing a structural member, the method comprising: moving a plurality of fibers (130) along an assembly line (100) at a speed of greater than about 20 feet per minute;
applying a binder to at least one of the plurality of fibers (130), wherein when the binder is applied, the plurality of fibers (130) are spaced apart and extend across a first area;
applying a traction agent (178) to at least one of the plurality of fibers (130) and the binder;
providing a die (180) having a first portion (195) with a first diameter positioned to receive the plurality of fibers (130) and a second portion with a second diameter positioned downstream of the first portion (195), wherein the first diameter is greater than the second diameter and wherein the die (180) is tapered between the first portion (195) and the second portion;

guiding the plurality of fibers along the die (180);

decreasing a distance between adjacent fibers of the plurality of fibers (130) with the die (180), wherein after decreasing the distance between adjacent fibers of the plurality of fibers (130), the plurality of fibers (130) extend across a second area that is smaller than the first area; and after decreasing, shaping the plurality of fibers (130) with a shaping station (115), wherein the traction agent increases friction between at least one of the fibers (130) and either an adjacent fiber or the die during shaping, and wherein the die (180) moves together with the plurality of fibers (130) along at least a portion of the assembly line (100).

19. The method of claim 18, wherein the die (180) is formed from a sacrificial film.

20. The method of claim 18, wherein applying the applying a traction agent (178) to at least one of the fibers (130) and the binder includes applying the traction agent (178) to at least one of the fibers (130) after applying the binder.

21. The method of claim 18, wherein applying the traction agent includes applying a first traction agent to the binder and mixing the first traction agent with the binder before applying the binder, and further includes applying a second traction agent to at least one of the plurality of fibers (130) after applying the binder.

* * * * *